United States Patent [19]

Lee

[11] 4,343,108

[45] Aug. 10, 1982

[54] DOUBLE DEEP TONE GOBBLER TURKEY CALL

[75] Inventor: Ben R. Lee, Coffeeville, Ala.

[73] Assignee: Lee Calls, Inc., Coffeeville, Ala.

[21] Appl. No.: 215,784

[22] Filed: Dec. 12, 1980

[51] Int. Cl.³ .............................................. A63H 5/00
[52] U.S. Cl. ..................................................... 46/189
[58] Field of Search ..................... 46/189, 177, 175 R, 46/174; 84/402, 408, 410

[56]   References Cited

U.S. PATENT DOCUMENTS

| | | | |
|---|---|---|---|
| 3,100,948 | 8/1963 | Tax | 46/189 |
| 3,367,064 | 2/1968 | Anthony et al. | 46/189 |
| 3,793,767 | 2/1974 | Pulley | 46/189 |

Primary Examiner—Robert Peshock
Assistant Examiner—Mickey Yu
Attorney, Agent, or Firm—Sughrue, Mion, Zinn, Macpeak and Seas

[57]   ABSTRACT

An elongated wooden box type turkey call having laterally opposed upwardly tapered, longitudinally slotted sidewalls which extend upwardly from a bottom wall, whose bottom surface is concave, are separated from each other by block type end pieces. The end pieces sandwich opposite sides of a central sound board sized and configured to the sidewalls and extending upwardly from the bottom wall to form dual sound chambers on opposite sides thereof. The sidewalls and the sound board extend vertically above the end pieces, and the upper edges are convexly arcuate. A wooden actuator top has a laterally double convex bottom surface, with the dual convex bottom surface portions extending longitudinally of the actuator top. The top is screwed at one end alternately through three laterally spaced holes to the box at the end pieces to permit the actuator top to be aligned with or deliberately misaligned with the open top box. The opposite end of the actuator top is rubber band coupled to the box, and the actuator top is scraped across the edges of the sidewalls and sound piece.

3 Claims, 5 Drawing Figures

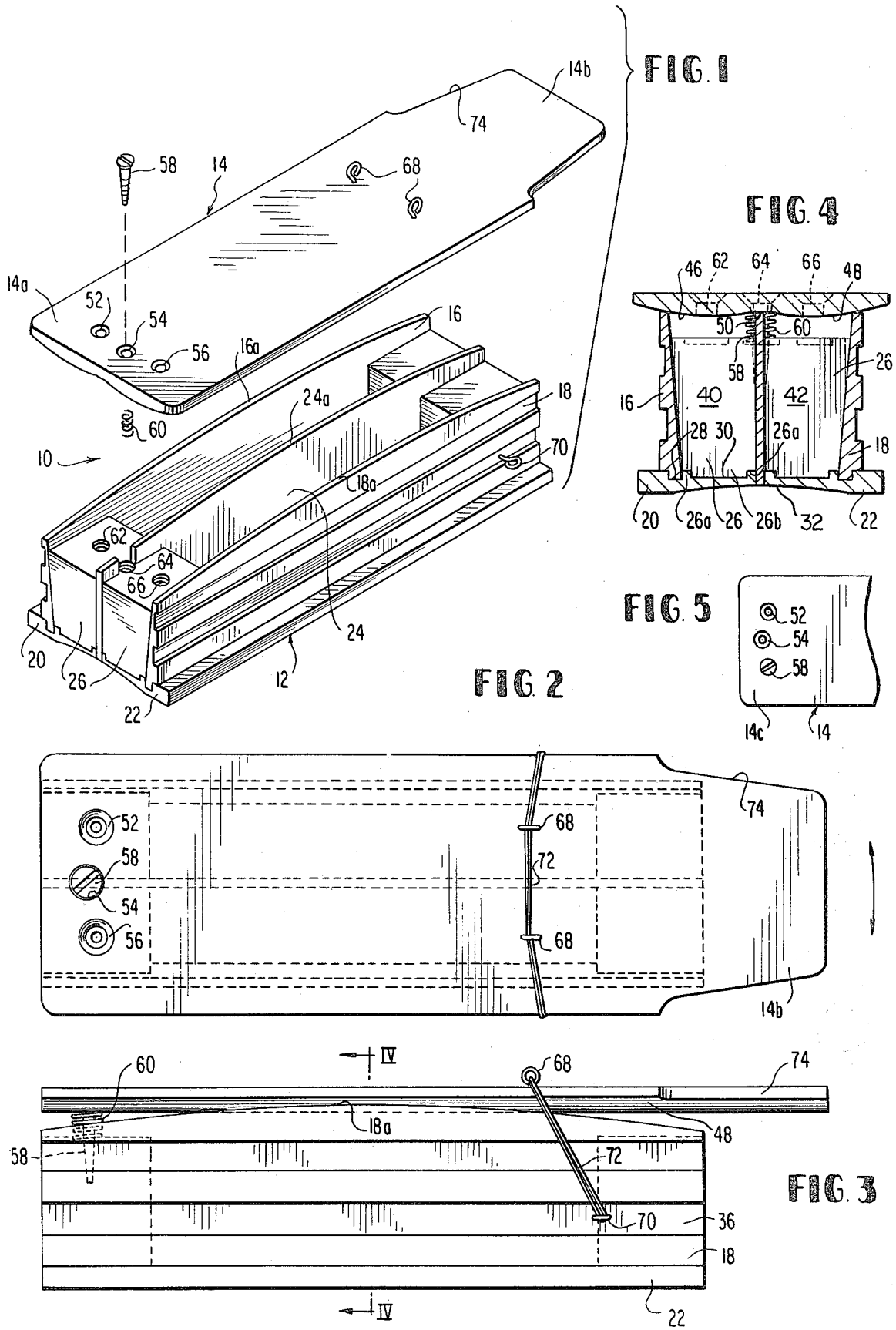

DOUBLE DEEP TONE GOBBLER TURKEY CALL

FIELD OF THE INVENTION

This invention relates to box type turkey calls, and more particularly to a turkey call permitting not only a double deep tone but a call in which the turkey call box assembly can be adjusted to reproduce gobbler yelps, hen yelps, purrs, clucks and the like.

BACKGROUND OF THE INVENTION

The applicant has been manufacturing and selling box type turkey calls for a number of years having some similar structural features to the turkey call of the instant invention. Characteristically, such box type turkey calls are manufactured of wood and take the form of an upwardly open elongated wooden box bearing arcuate edges on laterally opposed sidewalls. The sidewalls are separated by wooden blocks or end pieces, and the box completed by a longitudinally extending wooden bottom piece or wall with all components being glued or otherwise fixedly mounted to each other. Conventionally, a wooden actuator top comprising either a single piece or a multiple piece assembly bears an arcuate bottom surface which is transversely convex over the longitudinal extent overlying the end pieces. Typically, a screw projects through the actuator top at one end thereof, bears concentrically, a compression coil spring between the actuator top and the end block to which it is screwed, while a rubber band or the like presses the opposite end of the actuator top downwardly towards the underlying box. With the convex bottom face of the actuator top coated with chalk, by pivoting, that is, drawing the actuator top across the arcuate edges of the box sidewall, a sound is emitted by the turkey call closely simulating a gobbler or hen yelp. Other sounds such as purrs, clucks, etc., may be effected simply by dangling the call downwardly and rattling the call to the extent where relative movement occurs between the actuator top and the arcuate edges of the sidewalls.

In order to control the sound and to produce a sound which closely simulates that of an actual turkey, the applicant has provided longitudinal grooves at vertically spaced locations within the upper surface of the sidewalls and has tapered the sidewalls from the bottom piece upwardly to a slight degree. While this prior art construction is satisfactory and provides a turkey call which has great commercial acceptance, it is not capable of reproducing multiple tones and simulating the maximum variety of sounds actually given off employed by wild turkeys.

SUMMARY OF THE INVENTION

The present invention is directed to a double deep tone gobbler turkey call which comprises a generally rectangular, elongated upwardly open wooden box assembly. The assembly comprises laterally spaced vertical sidewalls; a longitudinally extending bottom wall fixedly mounting the lower ends of said laterally spaced vertical sidewalls throughout the length of the same. A thin vertical sound board is mounted to the longitudinally extending bottom wall and extends vertically upward generally parallel to the sidewall and laterally intermediate of the sidewalls. End blocks are positioned between the sound board on both sides thereof and respective sidewalls, at both ends of the assembly. The sidewalls, the sound board and the end blocks are rigidly coupled together and form laterally opposed sound chambers. The upper edges of the sidewalls and sound board are slightly convex and are raised relative to the top of the end blocks at at least one end thereof. An elongated, relatively thin wooden actuator top having a laterally double convex bottom surface is pivotably mounted, at one end, to the underlying upwardly open box and contacts the convex edges of the sidewalls and the sound board in the vicinity of the center thereof to provide a double tone reproduction of an actual turkey call.

Preferably, three laterally spaced holes are provided within the end of the actuator top, the center hole being positioned intermediate of the respective convex surface portions of the double convex bottom surface of the actuator top and the other holes to opposite sides thereof and being centered with respect to the double convex surface portions of the top.

Preferably, a screw projects through a selected hole and is screwed into one of three correspondingly positioned, holes within the end blocks at a given end of the box assembly. A coil spring surrounds the projecting portion of the screw between the bottom surface of the actuator top and the top of the end block bearing the screw receiving hole. A pair of laterally spaced eyes are screwed to the top of the actuator top and similar eyes are screwed to opposite sidewalls on the exterior thereof near the end of the box assembly opposite that pivotably mounting the actuator top. A rubber band passes through the eyes on the actuator top and is coupled at opposite ends to respective eyes on the sidewalls at their ends remote from the pivot axis of the actuator top.

BRIEF DESCRIPTION OF THE DRAWINGS

FIG. 1 is an exploded perspective view of the double deep tone gobbler turkey call of the present invention, in a preferred embodiment.

FIG. 2 is a top plan view of the turkey call of FIG. 1.

FIG. 3 is a side elevational view of the turkey call of FIGS. 1 and 2.

FIG. 4 is a vertical sectional view of the turkey call of FIG. 3 taken about line IV—IV.

FIG. 5 is a top plan view of a portion of the turkey call showing an alternate pivot point for the actuator top to the underlying box assembly for the reproduction of gobbler yelps, hen yelps, purrs, clucks, etc.

DESCRIPTION OF THE PREFERRED EMBODIMENT

Referring to the figures, FIG. 1 illustrates in an exploded perspective view a preferred embodiment of the invention. The highly versatile double tone gobbler turkey call indicated generally at 10 is comprised basically of two parts: an upwardly open double deep tone sound chamber wooden box assembly 12 and an overlying actuator top indicated generally at 14. The box assembly 12 is of modified elongated rectangular form. The main components 12 and 14 are formed of wood of varying given hardness. Laterally spaced wooden sidewalls 16 and 18 are fixedly mounted to and rise generally vertically upwardly from underlying respective left and right bottom pieces 20 and 22, the sidewalls and the bottom pieces being mirror images of each other. Interposed centrally between the sidewalls 16 and 18 is a thin vertically mounted wooden sound board 24 having its lower end sandwiched between the bottom pieces 20 and 22 throughout the length of the box assembly 12.

The sidewalls 16 and 18 are separated from but joined to the sound board 24 by means of paired end blocks or block type, end pieces 26 which are of modified cubic form and also formed of wood. They may be glued over their surface portions in contact with an joining the bottom pieces 20 and 22 sidewalls 16 and 18 and center sound board 24.

Specifically, as best seen in FIG. 4, the bottom pieces are of elongated flat thin wood strip form, the upper surface of which bears a narrow groove 28 and a rather wide groove 30 intermediate of its lateral edges, while the bottom surface of the bottom piece 20 bears an arcuate concave recess 32. With the bottom pieces 20 and 22 glued or otherwise fixedly mounted to the lower end of the center sound board 24, the box assembly is characterized by an arcuate, concave bottom surface adding measurably to the sound producing characteristics of the turkey call. Each end piece or end block 26 is provided with elongated grooves on opposite sides at the bottom thereof as at 26a, to provide a central projecting portion 26b which is received within groove 30 of the bottom piece 20 throughout the length of the box assembly. The laterally spaced end block or end piece 26 to the right thereof, FIG. 4, is identically configured and mounted to its bottom piece 22 and the sidewall 18.

Further, the outer surface sidewalls 16 and 18 are flat and vertical while the inner surfaces thereof taper upwardly to match the upwardly and outwardly tapered walls of blocks 26. To the outside of each of the tapered sidewalls 16 and 18, there are provided longitudinal slots as at 36, again to promote the sound characteristics and to prevent warpage of the sidewalls, over time. The configuration of the sidewalls and the nature of mounting of the sidewalls to a bottom wall of an upwardly open elongated box type turkey call is identical to that employed in the prior art calls described above, keeping in mind that the bottom of the prior art calls does not mount a central sound board, as in the instant case. Further, there are no dual tone chambers, and the actuator top 14 is not adjustably mounted to the box assembly 12 in the manner of the instant invention.

In that regard, the sidewalls 16 and 18 and the sound board 24 rise vertically above the tops of the end blocks or end pieces 26. Further, edges 16a, 18a and 24a of these members, respectively, are slightly convex such that normally only the center portion of the bottom surface of the actuator top makes contact with the central surface portions of the edges. Further, this provides openings to permit sound to radiate outwardly from both ends of the turkey call during use and with the actuator top 14 physically mounted to the box assembly 12. The actuator top 14 itself comprises a unitary thin wooden strip member having a flat upper surface and a laterally double convex bottom surface. Longitudinally extending transversely curved convex portions 46, 48 are separated by a generally flat portion 50 at the center of the actuator top 14, FIG. 4. As such, the central flat portion 50 contacts the convex edge 24a of the sound board, near its center, while curved convex surface portions 46, 48, respectively, on convex edges 16a, 18a of respective sidewalls 16 and 18, FIG. 4. The actuator top is removably, adjustably mounted to the box assembly 12 by a removable screw 58 which selectively passes through one of three laterally spaced holes 52, 54 or 56 within the actuator top 14, at one end thereof. Actually the end 14a which is remote from a projecting handle portion 14b which projects, FIG. 3, beyond the opposite end of the box assembly 12.

In FIG. 1, the screw 58 is shown as projectable through hole 54. The end projecting therethrough bears, concentrically, a compression coil spring 60 which is sandwiched intermediate of the bottom surface of the actuator top 14 and a hole in this case 64 drilled into abutting end pieces 26 and through the sound board 24. To opposite sides of hole 64 and within the center of end pieces 26 at the top thereof are additional holes 62, 66 which alternately receive the end of screw 58, a variation being shown in FIG. 5 with screw 58 being received within hole 56. The coil spring 60 surrounds the projecting portion of the screw 58 regardless of which hole 52, 54 or 56 is selected after it passes through the selected hole and is interposed between the bottom surface of the actuator top and the top of an end piece or end block 26 or the junction between those blocks, i.e. hole 64. The opposite end 14b of the actuator top forms the projecting handle giving a characteristic tapered configuration by way of tapered grooves or recesses 74 on opposite sides thereof.

Due to the configuration given to the bottom surface of the actuator top 14, and the convex edges 16a, 24a and 18a of respective sidewalls and the sound board 24, only the center portion of the actuator top, over a small surface area, makes contact with these convex edges, as seen in FIG. 3. Further, the coil spring tends to space or project end 14a of the actuator top outwardly and away from the blocks 26 to which it is pivotably mounted. In the vicinity of the end pieces at the opposite ends of the box assembly 12, means are provided for biasing the turkey call actuator top in normal position axially aligned with the box assembly 12, but pivotable about an axis defined by screw 58. In this respect, a pair of screw eyes 68 are screwed into the top of the surface actuator top 14, laterally spaced from each other and slightly inboard of end pieces 26, at the end opposite that bearing screw 58. Further, screw eyes 70 are provided to opposite sides of the box assembly, one each being screwed into sidewall 16 and 18, as shown. A rubber band 72 is threaded through the two eyes 68 and respective ends of the rubber band 72 are mounted to the screw eyes 70 on opposite sidewalls, so that the acuator top 14 is resiliently maintained in the position shown in the figures.

Alternatively, the sidewalls may be notched and a rubber band simply pulled over the assembly, with the actuator top 14 screwed in a selected position onto the box assembly 12. With the bottom surface of the actuator top coated with chalk, the turkey call is characteristically employed in making sounds simulating the sounds of an actual live wild turkey by scraping the actuator top 14 across the convex edges 16a, 24a and 18a of the double deep tone, double sound chamber call. Sound chambers 40 and 42 are partially formed and separated by the central sound board 24. As may be appreciated, there is no true symmetry between opposite sides of the box assembly, and the sounds generated by each side are slightly different to provide the desired double tone. In use, with one or more rubber bands around the call, that is, strapped about the actuator top and the box assembly 12, or a rubber band or bands attached to the screw eyes 68, 70, the operator grasps the call, holds its sidewalls and with the thumb placed around the end of the call, an index finger along the side of the call at the hinge or end bearing screw 58, the operator holds the call at right angles and by shaking the call and by bringing or lowering it down to the side, an artificial turkey call is effected. When the gobble is completed, the call handle 14b is pointing to the ground. To reproduce a gobbler yelp jake and hen yelps, purrs, clucks and putts, it is necessary to remove screw 58 from the center hole 54 and reposition the screw in either one of the side holes 52, 56 screwed to a give corresponding side hole within blocks 26 as at 62, 66, with the coil spring 60 interposed between the actuator top and the box 12 and surrounding the projecting end of the screw 58 to permit modification of the sound emanating from the dual chamber call. This permits the call to operate like any single box yelper.

As may be appreciated, the double deep tone provided by the dual chambers 40, 42 gives a perfect immitation of an old tom turkey gobble.

The sidewalls may be formed of Auderobia or Honduras or Philippine mahogany or select red cedar. The end pieces or blocks and the bottom pieces may be likewise formed. Also they may be formed of clear maple, oak, cap walnut or cherry. The top is preferably formed of walnut, oak or cedar, as such woods are sap free. The lip edges, tongues, etc. should tightly fit the grooves but without force fitting. The sidewalls preferably taper slightly to approximately five degrees. Changes may be made to the thickness and/or type of wood employed for the central sound board to vary the tone of the sound emitted by the turkey call during use.

Further, certain of the components may be formed of multiple strips of wood such as the actuator top 14 with different types of woods thereby contacting the respective sound projecing edges 16a, 18a and 24a of members forming the dual tone sound chambers 40, 42.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A highly versatile, double deep tone gobbler turkey call comprising a generally rectangular, elongated upwardly open wooden box assembly, said box assembly comprising:
    a longitudinally extending bottom wall,
    laterally spaced generally vertical sidewalls fixed at their lower ends to said bottom wall at opposite sides thereof,
    a vertical sound board sized and configured to said sidewalls and being fixed to and rising vertically from said bottom wall at the center thereof,
    end blocks positioned between said sound board, on both sides thereof, and respective sidewalls, at opposite ends of said box assembly, and being fixedly mounted therebetween and to said bottom wall to form dual tone sound chambers on respective sides of said sound board,
    the upper edges of said sidewalls and said sound board being longitudinally slightly convex,
    a generally planar wooden actuator top pivotably mounted at one end to the top of said wooden box assembly at an end thereof and having a laterally double convex bottom wall in contact with said convex edges of said sidewalls and said sound board such that pivoting of said actuator top causes lateral scraping of said actuator top simultaneously across the edges of both of said sidewalls and said sound board to imitate the double deep tone of an old tom turkey gobble.

2. The turkey call as claimed in claim 1, wherein said actuator top carries three laterally spaced holes within one end thereof including a center hole, and said wooden box assembly includes corresponding laterally spaced holes within said end blocks including a central hole passing through the upper edge of said sound board and at both end blocks at that end and a hole to each side thereof, and a set scew removably mounted within aligned holes of said actuator top and said wooden box assembly, and a helical coil compression spring concentrically mounted about the portion of said screw projecting through said actuator top and received within said aligned hole such that the pivot axis for the actuator top may be varied from a central position via said central hole to one of said side holes and to thereby permit said turkey call to be employed in the production of a double deep tone when the actuator top is pivotably mounted via said set screw through the center hole thereof or through either of said holes to the side thereof to reproduce a gobbler yelp, jake and hen yelp, purrs, clucks and putts, as desired.

3. The turkey call as claimed in claim 1, wherein said actuator top includes a pair of laterally spaced eye screws fixedly mounted to the top thereof at an end remote from the pivot mounting end of said actuator top, and wherein further screw eyes are mounted to the exterior surface of said sidewalls and at least one rubber band being threaded through said eyes on said actuator top and being looped over the screw eyes on said sidewalls such that said actuator top is resiliently biased by said rubber bands to a longitudinally aligned position with respect to the underlying wooden box assembly.

* * * * *